Feb. 9, 1926. 1,572,397
P. A. LAWRENCE
INTERNAL COMBUSTION ENGINE
Filed March 29, 1921    3 Sheets-Sheet 3

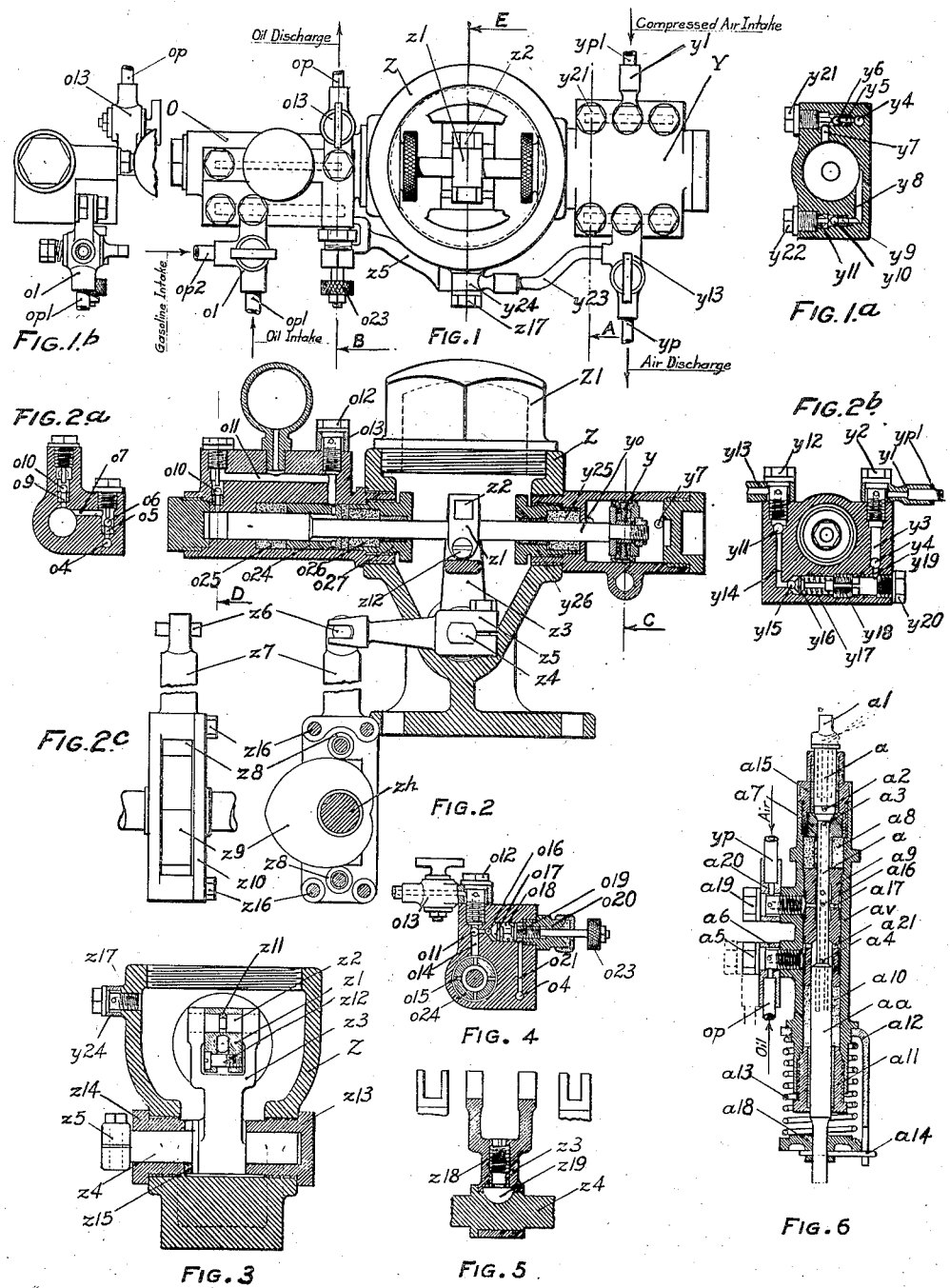

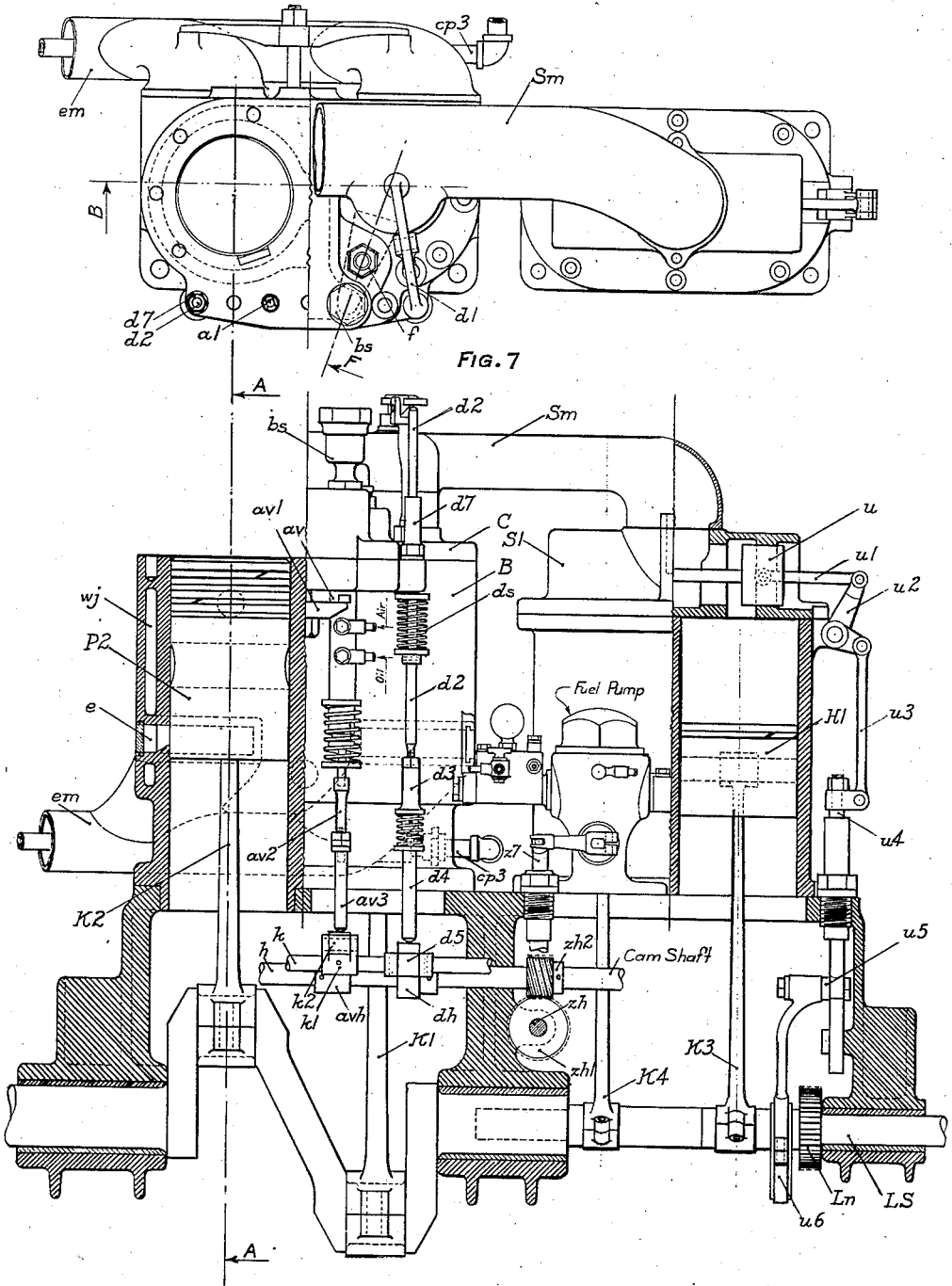

Witnesses
Oscar R. Kirschke
Frank Crocker

Inventor
Paul Andrew Lawrence

Patented Feb. 9, 1926.

1,572,397

UNITED STATES PATENT OFFICE.

PAUL ANDREW LAWRENCE, OF GRAND ISLAND, NEBRASKA.

INTERNAL-COMBUSTION ENGINE.

Application filed March 29, 1921. Serial No. 456,702.

*To all whom it may concern:*

Be it known that I, PAUL ANDREW LAWRENCE, a citizen of the United States, residing at Grand Island, in the county of Hall and State of Nebraska, have invented a new and useful Improvement in Internal-Combustion Engines, of which the following is a specification.

My invention relates to an improved means of injecting liquid fuel into the cylinder of an internal combustion engine of a certain constant pressure type. As the invention relates to a definite type of engine, it is essential to an understanding of the principles thereof to illustrate and describe the engine in detail.

The invention is particularly applicable to the use of heavy oils and for engines which have to work under a variable speed and load, such as marine, tractor and automobile engines. The type of engine chosen for illustration in these drawings and specifications is an engine of this type and is controlled by hand.

This type of engine operates by compressing air to such a pressure that the heat resulting from the compression of the charge of air is sufficient to ignite the fuel as fast as it is injected into the cylinder. It does not simply compress the air and then inject the fuel into the air behind the piston, but brings a current of air and a current of oil together in a port and, as fast as they unite in combustion, they pass on to the cylinder and out of the way of the incoming air and oil. In this manner, the last portion of oil meets with as pure air as the first portion and combustion is perfect throughout.

This is done by means of an air chamber attached to the cylinder head and, preferably, formed within a hollow of the head and closed by a poppet valve which permits air to enter the air chamber, but prevents it from returning unless held open by some external force or means. The air chamber contains compressed air of a pressure equal to the compression pressure of the engine. Said compressed air being supplied by the engine itself through the air chamber valve retaining a portion of the air compressed by the piston, instead of permitting all the air it contains to enter the cylinder. The air chamber is connected to the cylinder by a port into which the fuel is injected, and where it meets the air flowing into the cylinder from the air chamber while the air chamber valve is being held open. A spark plug is inserted into this port so that, when the pressure is too low for spontaneous ignition, the spark plug may be used to ignite the fuel. The spark plug is also necessary to ignite the fuel when starting a cold engine.

The engine described and illustrated is a two stroke cycle engine, but, as this type of engine is equally well adapted for four stroke cycle of operation, the invention is, likewise, equally adapted to both kinds.

The injection of liquid fuel in this type of engine in the form of a finely divided spray, without the admixture of air, gives satisfactory results, where the speed of the engine is quite uniform, so that the size of the nozzle and, consequently, the velocity of entrance of the fuel may be well harmonized. But where the speed is variable, it is manifestly impossible to maintain a proper velocity through a nozzle of fixed size for the best atomizing effects. Moreover, in small sized engines, the quantity of oil injected per stroke is so small that the size of the nozzle for liquid fuel injection becomes so minute that it is liable to become choked with the smallest particle of foreign matter. The use of nozzles of automatic variable opening are, likewise, not very satisfactory in such small sizes as the capillary attraction of the oil interferes with proper spraying effects.

In view of these objections to the use of a spray composed entirely of a liquid, it is desirable to mix a considerable quantity of air with the oil, thereby making it possible to use larger nozzles and also to make it possible to secure a nearly uniform velocity of the fuel through a fixed sized nozzle with a variable speed of the engine.

The invention has, as one of its objects, the automatic regulation of the quantity of air to be mixed with the oil, whereby, when the engine is running at low speed, the quantity of air entering with the oil is a maximum, while, when the engine is running at high speed, the quantity of air entering per stroke is a minimum. The proportions of air to oil, therefore, varies with the speed of the engine, while the quantity of oil injected per stroke may remain the same or otherwise, but the two fluids together always properly fill the nozzle for the best atomizing effects.

In engines of the Diesel type, the oil is sprayed into the cylinder by a heavy current of air, which atomizes the oil and creates a current or stirring action in the cylinder, to bring about perfect combustion. The stirring action, necessary in the Diesel engine, is not required in the type of engine herein described and to which my invention is particularly adapted, because the fuel is injected into a moving body of air, instead of into a mass of motionless air. Engines of the Diesel type require an air compressor to compress the air for this purpose but, in the engine described, no compressor is needed, because the engine stores part of the air it compresses, in the regular processes of operation, for the purpose of starting and manipulating the engine. In my invention, a portion of this stored up air is used to mix with the fuel and is simply pumped into the engine cylinder with a small air pump without the necessity of compressing it.

The invention consists, essentially, of a duplex pump, pumping oil with one plunger and the air with another plunger. The oil is pumped against the full pressure of the engine, but the air is simply taken from the air bottle or from the air chamber of the engine and pumped into the cylinder with the oil. The manner in which the invention is carried out in practice and the type of engine to which it is applicable will be better understood by referring to the drawings, but it must be understood that the invention is not limited to any particular form of pump used or mechanism employed, but to the principle of the processes herein defined and set forth in the claims.

The engine illustrated is a two cylinder, single acting, two stroke cycle engine, having a low pressure air pump to deliver air to the cylinders for scavenging and charging the cylinders. This air pump is also a two cylinder, single acting machine. It will be seen that the cranks for the engine cylinders are angularly spaced 180 degrees apart and the cranks for the air pump cylinders are, likewise, 180 degrees apart. This feature gives a nearly perfect balance of moving parts and permits of high speed without vibration.

Referring to the drawings:

Figure 1 is a top view of the fuel pump, with the cap, z—1, removed.

Fig. 1ª is a cross sectional view of the air pump cylinder through one set of the valves upon the section plane, A.

Fig. 1ᵇ is an end view of the oil pump cylinder only.

Figure 2 is a longitudinal section of the pump, taken upon a vertical section plane passing through the center line of both the oil and air pump cylinders.

Fig. 2ᵇ is a cross sectional view of the air pump cylinder taken upon the plane, C.

Fig. 2ª is a cross sectional view of the oil pump cylinder taken upon the plane, D.

Fig. 2ᶜ is an end view of the heart cam and yoke, which operates the fuel pump.

Figure 3 is a vertical cross section of the pump upon the section plane, E, of Figure 1, to show the driving mechanism of the pump rod.

Figure 4 is a cross section of the oil pump cylinder upon the section plane, B, and shows the by-pass for regulating the pump pressure and the working pressure of the engine.

Figure 5 is a section through the arm, z—3, to show how it is secured to the shaft, z—4.

Figure 6 is the admission valve. It is taken upon a vertical section plane passing through the center line of the valve. One of these valves is required for each engine cylinder, and it is operated by a cam on the cam shaft of the engine.

Figure 7 is a top view of the engine and the low pressure air pump cylinders, for scavenging and charging the engine cylinders. In this view, one-half of the cylinder head of the engine is cut away to show the upper surface of the cylinder. By reason of the valves in the cylinder head there is not sufficient room for the entire chamber to be formed in the head, and a portion is, therefore, formed in a separate vessel attached to the rear part of the cylinder head, but which is not shown in this view.

Figure 8 is a partial front elevation and sectional view of the engine and air pump. A vertical section plane passes through one-half of the engine cylinder, showing one of the pistons and rod, and another passes through the air pump cylinder in like manner. The entire frame is cut by a vertical section plane passing through the center line of the shaft. The engine and pump cylinders are mounted side by side upon the same frame and operate from the same crank shaft. As the pump has very little work to do and as the pressure never rises above 10 lbs., the working parts can be made very light. The air pump uses a piston valve in the head for distributing the air to the engine, which results in a positive volumetric delivery at high speed. The inlet valves for the engine are in the head. The exhaust takes place through ports in the walls of the cylinder, which the piston uncovers at the end of the stroke. The inlet valves are positively opened by cams on a cam shaft. The same cam shaft is used for operating the valves for the injection of the fuel.

Figure 9:
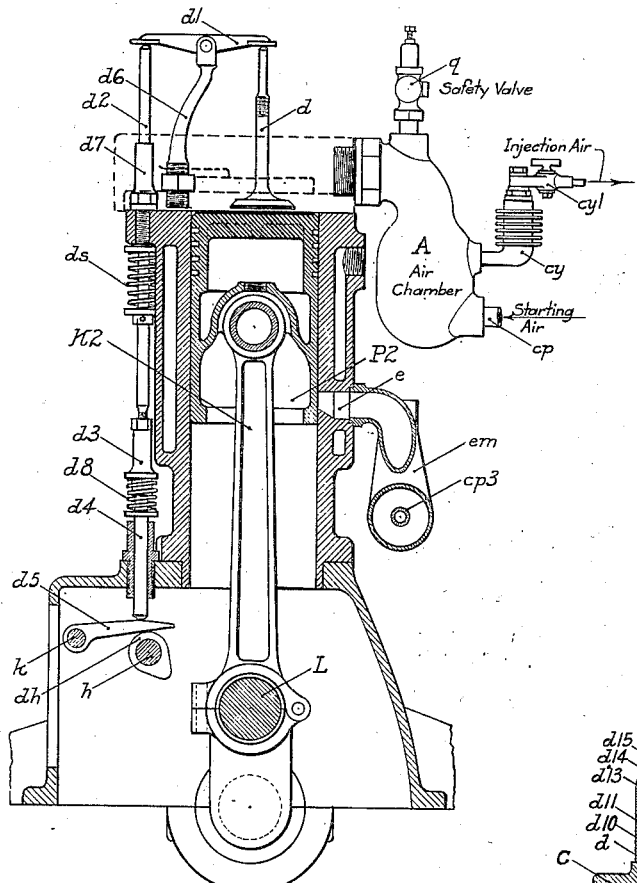

Figure 9 is a sectional view of the engine cylinder, perpendicular to the crank shaft, the section plane passing through the cylinder upon the line, A—A of Fig. 8. In this view, the head is removed in order to show the location of the intake valve; but the air chamber, which is attached to the cylinder head, is left in its normal position and is shown in elevation. It shows the intake valve mechanism from the cam to the valve.

Figure 10:
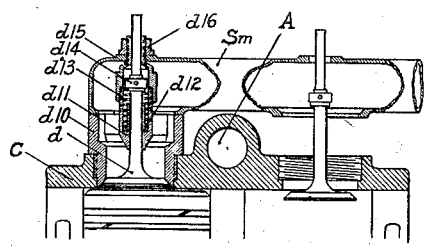

Figure 10 is a vertical section through the cylinder head, showing the intake valves and their mounting in the head. The section plane passes through the center of the valve stem and cuts the cylinder head longitudinally along the line, B, Figure 7.

Figure 11A:
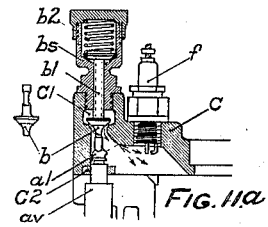
Figure 11:
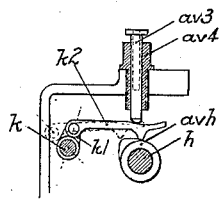

Figure 11 shows the admission cam and mechanism used to terminate the fuel admission period from zero to about three-fourths of the power stroke of the engine.

Fig. 11ª is a vertical section through the cylinder head upon the plane, F, Figure 7, and shows how the air chamber valve, $b$, is held open while the fuel enters the combustion port through the nozzle, $a$—1. It also shows how favorably the spark plug, $f$, is located to ignite the fuel, in case the engine is cold or the compression pressure too low for spontaneous ignition.

Figure 12:
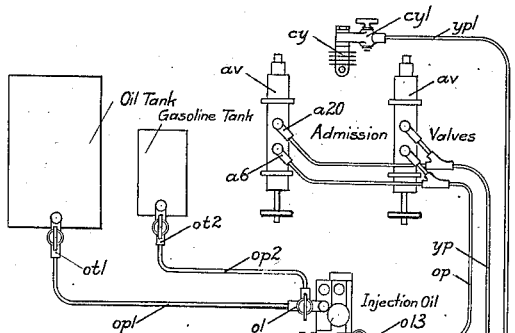

Figure 12 is a diagrammatical plan of the air and oil piping and the apparatus for injecting the fuel.

Figure 13:
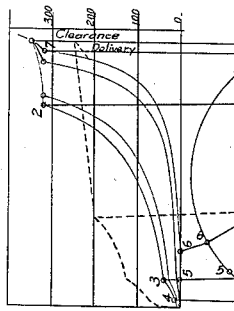

Figure 13 is a diagrammatical construction of the valve timing and pressure functions of the working fluid of the engine, and will be readily understood by those skilled in the art to which the diagrams relate. The starting point in the valve timing is with the position of the crank in the position shown in Figure 9 and is indicated in the diagram by the figure, "1."

In all the views, similar figures correspond to the same parts, so that parts may be located in the different views and their relationship traced throughout.

The fuel pump, illustrated on the first sheet, is a combined oil and air pump, pumping the oil at one end and the air at the other. The oil and air are delivered through separate pipes to the admission valves, where the two are mixed and delivered into the engine cylinders.

The oil and gasoline are conducted to the three-way cock, $o$—1, of Figure 1, through the pipes, $o$—$p$—1 and $o$—$p$—2. The cock, $o$—1, may be turned to admit gasoline for starting or to admit oil for regular running. From here the oil passes down into the suction port, $o$—4, as shown in Fig. 2ª. Upon the suction stroke, the oil passes through the ball valve, $o$—6, and port, $o$—7, into the pump cylinder and from here it is forced up through the ball valve, $o$—10, into the discharge port, $o$—11, during the discharge stroke.

The suction of the pump is single acting, but the discharge is double acting. This is accomplished by the differential effect of the rod and piston. The piston rod, $y$—$o$, is enlarged to form a piston. Packing is inserted at $o$—25 and at $o$—26. The enlarged portion is twice the area of the rod, so that when the piston moves to the right, the delivery of oil takes place by reason of the displacement of the enlarged portion minus the displacement of the rod, while, when the piston moves to the left, the delivery results from the displacement or plunger action of the rod.

The oil required by the engine passes out through the hollow screw, $o$—12, the cock, $o$—13, and the pipe, $o$—$p$, to the admission valves, while the surplus oil passes through the spring loaded by-pass, shown in Figure 4, back to the suction port, $o$—4. The pump delivers its full capacity and the varying demands of oil by the engine are met by by-passing the surplus.

Referring to Figure 4, the operating parts of the by-pass simply consists of a small steel ball, $o$—16, a spring seat, $o$—17, a spring, $o$—18, and an adjustable member, $o$—19. By turning the knurled wheel, $o$—23, the spring, $o$—18, is adjusted and the discharge pressure of the pump is adjusted correspondingly.

The air pump is of the ordinary double acting construction, receiving air on one side of the piston while delivering air on the other side. The suction and discharge valves for one end of the cylinder are shown in the view Fig. 1ª. The air from the air chamber of the engine enters through the pipe, $y$—$p$—1, and reaches the suction port, $y$—4. It then passes through the suction valve, $y$—6, and the port, $y$—7, into the cylinder and is then delivered through the port, $y$—8, and the discharge valve, $y$—10, into the discharge port, $y$—11, and out through the cock, $y$—13, and the pipe, $y$—$p$, to the admission valves. A similar set of valves is placed at the other end of the cylinder to make the pump double acting.

The pump body is heavily made and is threaded to receive the oil pump on one side and the air pump on the other side. The top opening is threaded to receive a cap, Z—1. This makes the interior of the pump body air tight. The discharge from the air pump is connected to the pump body by the pipe, $y$—23, so the interior of the pump body is under the same pressure as the discharge pressure of both the oil and the air pump. This feature serves a two fold purpose. It entirely relieves the packing, $y$—25 and $o$—26, of high pressure and also forms a pressure equalizer for the air pump. Sufficient lubricating oil is placed in the body to lubricate the moving parts.

The air pump displacement is about ten times the volumetric oil pump displacement.

The piston rod of the pump is driven by the arm, $z$—3, which is secured to the shaft, $z$—4. A ring of packing is inserted at $z$—15, to prevent leakage for the pressure in the body, Z, is very high. An outside arm, z—5, connects to the reciprocating member, z—7, which is actuated by the heart cam, z—9. The heart cam imparts a uniform motion to the pump pistons, which results in a steady discharge flow, there being only a slight interruption at the ends of the stroke. These interruptions are compensated for by an air chamber on the oil pump and the reserve air in the body of the pump for the air pump.

The admission valve, shown in Figure 6, has a nozzle composed of a small round hole through which the oil and air are forced into the engine cylinder. The hole is of such a size that it requires a definite pressure to force the fluid through the nozzle, thereby generating sufficient velocity to properly atomize the oil when it strikes the roof of the combustion port, as illustrated in Figure 11ᵃ. If no air were mixed with the oil, the hole in the nozzle would be considerably too large for proper atomizing, even at the highest speed of the engine, but, if all the air which the pump delivers had to pass through the nozzle at high engine speed, the hole would be too small and would result in unnecessarily high pump pressures and this, in turn, would affect the operating pressure of the engine unless a readjustment was made by means of the valve shown in Figure 4. The quantity of oil injected is dependent upon the load the engine is carrying, but, by varying the amount of air injected with oil in harmony with the speed of the engine, the velocity of fluid entrance is kept quite uniform. This feature is accomplished by means of the spring loaded air by-pass, shown in the view to the right of Figure 2. This by-pass consists essentially of a steel ball, y—15, held to its seat by the spring, y—17, and which is adjustable by the screw, y—18. By removing the plug, y—20, a screw driver may be inserted and adjustment effected. This by-pass determines the ultimate pressure with which the fuel is driven through the nozzle, and whenever the speed of the engine becomes high enough, a portion of the air by-passes, but the quantity of oil injected is not interfered with. No change of adjustment is required when once properly set, and the operating pressure of the engine may be raised or lowered without interference or effect from this by-pass.

Figure 6 is a detailed view of the admission valve. The operating member or rod consists of three pieces and serves the twofold purpose of acting as a valve and for the admission of fuel and a push rod to open the air chamber valve, b, shown in Figure 11ᵃ. The lower rod, a—a, is threaded to receive the upper rod, a. The upper rod is drilled hollow, as shown by the dotted lines, and has ports drilled to communicate with the hollow interior. The rod, a, is enlarged at the upper end to form a valve head and also to receive the nozzle member, a—1, which screws into the rod, a. The valve head rests on a removable seat, a—7, which, in turn, rests on soft packing, a—8. The soft packing serves to cushion the blow of the seating of the valve. If the seat is made of fiber instead of metal, the cushion of soft packing is not needed. The rod is operated by the mechanism, shown in Figure 11, and it will be seen that the opening of the admission valve is always accompanied by the opening of the air chamber valve. The oil and air is forced into the valve by the fuel pump through the pipes, o—p and y—p, and the interior of the valve, a—v, is always under the full discharge pressure of the fuel pump. In order to balance this pressure tendency of raising the valve rod, the lower portion, a—a, is made the same diameter as the valve head. When the valve is open during the admission period, the pressure is about 50 lbs. higher in the valve than in the cylinder or combustion port, and the oil and air enter the cylinder as follows:

The oil enters through the hollow screw, a—5, the ports a—21 and a—4, to the interior of the rod, a. The air enters through the hollow screw, a—19, the ports, a—17 and a—16, to the interior of the rod, a. Here the oil and air mix and together they pass up the hollow interior, then through the ports, a—3, around the valve head, through the ports, a—2, through the hollow nozzle member, a—1, and out through the nozzle. The nozzle is directed upward, so that the fuel is projected at high velocity against the hot cylinder head, which dashes the oil into a very fine spray.

Owing to the volumetric displacement of the rod, a—a, a greater portion of the oil enters during the early part of the valve opening or while the rod is ascending and less when the rod descends. This is a favorable feature for small high speed engines, but is not desirable for large slow speed engines. In the later case, the air connection, a—20, is connected together with a—6 by the same hollow screw, and the upper connection and ports are omitted or plugged. In this position, the oil enters the cylinder in response to the accelerating engine piston demands for the entire admission period. The nozzle must always point in the proper direction and, therefore, the rod must be kept from turning. This is accomplished by the member, a—12, which may be turned until the nozzle is properly directed and remains in place by the pressure of the spring, a—13.

The application of the invention to the type of engine for which it is adapted will be understood by a description of the operation of the engine.

From Figure 9 it will be seen that the piston comes very close to the head and, therefore, the volumetric clearance is reduced to a very small percentage.

The air scavenging pump has the same cylinder diameter and stroke as the engine and, therefore, delivers about one-fourth more air than the volume compressed by the engine. The cranks of the pump are set at 90 degrees with the cranks of the engine, so that the greater portion of the pump delivery occurs during the intake period of the engine. In this way, no unnecessary rise of pressure occurs in the pump, due to lack of harmony between these two functions.

The fuel pump supplies fuel to the admission valves at a constant pressure at all times, and has sufficient capacity for complete union with all the air which could possibly enter the cylinder for the latest cut off.

Referring to Figure 13, the admission period of the engine, under normal operation, extends from 1 to 2 or any smaller angle. However, when starting, the admission period may be as great as shown by the dotted lines while taking air from the air bottle.

The expansion period extends to the point 3, where the piston uncovers the exhaust ports and exhaust begins.

At 4, the intake valve opens and air rushes in through the intake valve, $d$, driving out the remaining products of combustion and filling the cylinder with pure air.

At 5, the piston again covers the ports, but the intake valve is still open, and part of the air returns through the intake valve.

At 6, the intake valve closes and compression begins.

At 7, the compression has reached the same pressure as the pressure in the air chamber, and delivery to the air chamber begins.

At 1, the delivery is completed and approximately one-half of the air compressed has been delivered into the air chamber. The admission valve is just opening and the air chamber valve, $b$, is held from its seat, as shown in Figure 11ª. As the piston advances, fuel enters through the nozzle, $a$—1, and air from the air chamber enters through the port, C—1, and the open valve, $b$. The temperature of the air is high enough to ignite the oil as fast as it enters. In starting, when the temperature is not high enough, ignition is effected by the spark plug, $f$.

The admission period is increased or decreased, in accordance with the load on the engine, by rocking the shaft, $k$, to and fro. This advances or recedes the follower, $k$—2, to different positions of the cam, $a$—$v$—$h$. The dotted lines show the position of the cam follower, $k$—2, in position of zero cut-off. In this position no fuel enters the engine cylinder, and the valve, $b$, is not held from its seat. It, therefore, acts as a check valve and the engine runs as an air compressor, delivering air to the air chamber but receiving none in return. This results in rapidly bringing the engine to a stop.

It will be seen that the pressure in the air chamber, A, passes through a cycle for every engine cycle. The pressure rises from 7 to 1 and falls from 1 to 2, which is the same as 1 to 7.

The injection air for the fuel pump is conveniently taken from the air chamber, as shown in Figure 9. An air cooler, $c$—$y$, is attached to partially cool the air and condense the water. The air then passes through the cock, $c$—$y$—1, and the pipe, $y$—$p$—1, shown in Figure 12, to the fuel pump. The fuel is taken from the oil tank, when running, or from the gasoline tank, when starting, by means of the three-way cock, shown in Figure 12. The air and oil from the fuel pump are conducted in the pipes, $y$—$p$ and $o$—$p$, respectively, to the admission valves, where they mix and enter the cylinders.

The engine is started by admitting compressed air from the air bottle. The air for this purpose being stored by the engine in the regular process of operation. The engine is stopped by reducing the cut-off to zero.

Compressed air has, heretofore, been used for driving the fuel into the cylinder, the processes being attended by a division of the fuel and a stirring action of the air behind the piston, in order to bring the fuel into contact with the air for combustion. In the engine described, no stirring action is required and it is only necessary to finely divide the oil to secure perfect combustion. In my invention, the air does not drive the oil into the cylinder, but each is pumped separately and enters by its own motive force, independently of the other's motive force.

What I claim as new and desire to secure by Letters Patent is:

1. In an internal combustion engine comprising a cylinder, a piston, an air chamber forming a clearance for the air compressed by the piston, a valve to control the flow of air between the cylinder and air chamber, and a combustion port forming a passage for the air between the cylinder and air chamber; the combination of a pump comprising means for pumping fuel from an ordinary source of supply and air from the said air chamber; a valve for receiving said fuel and air and injecting said mixture into the combustion port; and means for opening said air chamber valve during the said injection period.

2. In an internal combustion engine of the constant pressure type having an air chamber closed by a valve and containing compressed air of a pressure approximately equivalent to the normal working pressure of the engine, and an admission valve for each cylinder to admit a mixture of air and liquid fuel during the admission period of the power stroke of the engine; the combination therewith of a pump for delivering both liquid fuel and air under constant pressure to the said admission valves.

3. In an internal combustion engine of the type described the combination of an air chamber; an air chamber valve to close the opening of said air chamber to the cylinder; an admission valve for injecting a mixture of fuel and air; means for opening said air chamber valve during fuel injection; a cam for driving said admission valve; a cam follower interposed between said cam and admission valve; and means for shifting said follower backward and forward thereby changing the fuel injection period.

4. In an internal combustion engine of the type described having an admission valve for injecting a mixture of liquid fuel and air into the cylinder of the engine, the combination therewith of a pump for supplying liquid fuel and air at constant pressure to the admission valve and having means for adjusting the discharge or injection pressure of said pump.

5. In an internal combustion engine of the type described having an admission valve for injecting a mixture of liquid fuel and air into the cylinder of the engine, the combination therewith of a pump for supplying liquid fuel and air under constant pressure to the admission valve, means for adjusting said injection pressure to raise or lower the normal working pressure of the engine, and means for regulating the proportion of liquid fuel and air delivered to the said admission valve.

6. In an internal combustion engine of the type described the combination of an admission valve for each cylinder for injecting a mixture of liquid fuel and air; a pump for delivering liquid fuel and air under constant pressure; an adjustable spring loaded by-pass valve for by-passing the surplus oil; and an adjustable spring loaded by-pass valve for by-passing the surplus air.

7. In an internal combustion engine of the type described having a source of compressed air supply of a pressure approximately equal to the normal compression pressure of the engine, the combination of an admission valve for each cylinder for injecting a mixture of liquid fuel and air; a pump for supplying liquid fuel and air to said admission valves, said pump receiving liquid fuel without pressure and delivering it at normal injection pressure; said pump also receiving compressed air from the engine of approximately normal compression pressure and delivering it at normal injection pressure.

8. In an internal combustion engine having a cylinder; a piston moving therein and connected to a crank shaft; an air chamber connected to the cylinder containing compressed air and receiving a portion of the air compressed by the motion of the piston; a valve to control the opening of said air chamber into said cylinder; and a fuel admission valve for injecting a mixture of liquid fuel and air into said cylinder during a portion of the power stroke; the combination therewith of a fuel pump for supplying said admission valve with liquid fuel and air, said pump receiving liquid fuel at any pressure lower than the injection pressure required by the engine and delivering said fuel to the admission valve at the required injection pressure of the engine; said pump also receiving compressed air from the air chamber of said engine and delivering said air to said admission valve at the required injection pressure of the engine.

9. In an internal combustion engine the combination of a cylinder; a piston moving therein and connected to a crank shaft; an air chamber connected to the cylinder; a valve to control the opening between said air chamber and cylinder; an admission valve for injecting a mixture of liquid fuel and air into said cylinder; means for operating said admission valve to inject fuel into said cylinder for some definite portion of the power stroke depending upon the load on the engine; means for retaining said air chamber valve in an open position during the fuel injection period of the power stroke; a fuel pump receiving liquid fuel from an ordinary source of supply and delivering it to said admission valve at injection pressure; a by-pass valve for by-passing the surplus liquid fuel; means for adjusting said by-pass valve; said fuel pump also receiving compressed air from the said air chamber of the engine and delivering it to the said admission valve at injection pressure; a by-pass valve for by-passing the surplus compressed air at the higher speeds of the engine; and means for adjusting the said by-pass.

10. In a constant pressure internal combustion engine of the type described the combination of; a fuel pump delivering a mixture of liquid fuel and air under a definite constant pressure to an admission valve in each cylinder for injecting the fuel during a variable portion of the power stroke of the engine depending upon the load; an admission valve for each cylinder so positioned in the cylinder that when open it likewise opens the air chamber valve, but, otherwise, leaves said air chamber valve free and independent; a cam shaft carrying a cam of proper contour for each admisison valve; a cam follower for each cam making contact with said cam by a projection or nose; and a control shaft having an arm for each cam follower to which said cam follower is hinged, and swings freely about the point of suspension so that in rocking said control shaft to and fro said cam follower moves forward or backward across the said cam, thereby changing the point of contact of said cam follower with said cam and, consequently, the length of time the admission valve remains open.

11. In an internal combustion engine injecting fuel into the cylinder simultaneously with the inflow of air from an air chamber and in which the fuel injection always begins at a fixed point of the engine crank position but is cut off at different positions of said crank travel, the combination therewith of a fuel injection cam; a cam follower hinged at one end and making contact with said cam by a projection near its free end and carrying a push rod on its back surface; an oscillating shaft having an arm to which said cam follower is hinged; and a concurrent contour between the leading surface of the cam and the back surface of the follower, upon which the push rod rests, whereby when the cam follower is moved to and fro by the oscillating shaft, the fuel injection will always commence at the same relative position with the engine crank and be cut off at different relative positions of the crank travel.

PAUL ANDREW LAWRENCE.